United States Patent
Asafi (10) Patent No.: US 12,425,368 B1
(45) Date of Patent: Sep. 23, 2025

(54) TECHNIQUES FOR PROVIDING RESILIENT MULTI-LOCATION NETWORK ROUTING

(71) Applicant: Qwilt Inc., Redwood City, CA (US)

(72) Inventor: Shmuel Asafi, Petah Tikva (IL)

(73) Assignee: Qwilt Inc., Redwood City, CA (US)

( * ) Notice: Subject to any disclaimer, the term of this patent is extended or adjusted under 35 U.S.C. 154(b) by 0 days.

(21) Appl. No.: 19/095,771

(22) Filed: Mar. 31, 2025

(51) Int. Cl.
  *H04L 61/5069* (2022.01)
  *H04L 61/4511* (2022.01)
  *H04L 61/5084* (2022.01)
  *H04L 67/568* (2022.01)
  *H04L 9/40* (2022.01)
  *H04L 61/5076* (2022.01)

(52) U.S. Cl.
  CPC ...... *H04L 61/5069* (2022.05); *H04L 61/4511* (2022.05); *H04L 61/5084* (2022.05); *H04L 67/568* (2022.05); *H04L 61/5076* (2022.05); *H04L 63/0227* (2013.01)

(58) Field of Classification Search
  CPC ............. H04L 61/5069; H04L 61/5076; H04L 61/5084; H04L 61/5092; H04L 63/02; H04L 63/0227; H04L 63/0414; H04L 63/083; H04L 63/10; H04L 63/101; H04L 63/102; H04L 63/104; H04L 63/105
  USPC ......................................... 709/220, 224–228
  See application file for complete search history.

(56) References Cited

U.S. PATENT DOCUMENTS

| | | | |
|---|---|---|---|
| 7,313,631 B1 * | 12/2007 | Sesmun | H04W 8/26 370/310 |
| 9,560,124 B2 | 1/2017 | Eisenbud et al. | |
| 10,979,387 B2 | 4/2021 | Maslak | |
| 11,190,481 B2 | 11/2021 | Sawyer et al. | |
| 2003/0079027 A1* | 4/2003 | Slocombe | H04L 67/54 709/217 |
| 2008/0313350 A1* | 12/2008 | Swinton | H04W 4/02 709/240 |
| 2011/0047252 A1* | 2/2011 | Kwapniewski | H04L 61/4511 709/242 |
| 2011/0146038 A1* | 6/2011 | Ko | D04H 1/4374 28/100 |
| 2011/0153941 A1* | 6/2011 | Spatscheck | G06F 9/5083 711/119 |
| 2011/0154101 A1* | 6/2011 | Merwe | G06F 11/3006 718/1 |

(Continued)

FOREIGN PATENT DOCUMENTS

| | | | | |
|---|---|---|---|---|
| CA | 2859163 C | * | 3/2020 | ......... H04L 41/0856 |
| DE | 60122782 T2 | * | 8/2007 | ............. H04L 12/18 |
| EP | 3869763 A1 | * | 8/2021 | ......... H04L 65/1069 |

*Primary Examiner* — Khanh Q Dinh
(74) *Attorney, Agent, or Firm* — M&B IP Analysts, LLC (57) ABSTRACT

A system and method for providing resilient multi-location content networks is presented. The method includes initiating a plurality of cache groups in a content network, each cache group including a plurality of cache servers; assigning a first cache server of a first cache group of the plurality of cache groups a first anycast address of a plurality of anycast addresses, the first anycast address assigned to a second cache server of a second cache group of the plurality of cache groups; and assigning the second cache server of the second cache group a second anycast address of the plurality of anycast addresses, the second anycast address assigned to another cache server, wherein the another cache server is in a third cache group.

11 Claims, 4 Drawing Sheets

(56) References Cited

U.S. PATENT DOCUMENTS

2016/0119279 A1* 4/2016 Maslak .................. H04L 67/52

* cited by examiner

TECHNIQUES FOR PROVIDING RESILIENT MULTI-LOCATION NETWORK ROUTING

TECHNICAL FIELD

The present disclosure relates generally to anycast routing, and specifically to improving resilience in multi-location network routing using anycast protocols.

BACKGROUND

Anycast is a network addressing and routing method where the same IP address is assigned to multiple servers or locations across a network. When a request is sent to an anycast IP, it is routed to the nearest or most optimal server based on factors like latency, network distance, or availability. This "closest server" selection improves performance, reduces latency, and enhances reliability.

Anycast is widely used in content delivery networks (CDNs), DNS services, and distributed systems to provide faster responses and mitigate failures. For example, in DNS, an anycast-enabled server ensures queries are directed to the nearest DNS resolver, reducing lookup times. It also helps with load balancing and distributing traffic efficiently.

A challenge with anycast is ensuring consistent routing, as changes in network topology or congestion can redirect traffic unexpectedly, causing potential disruptions or inefficiencies. Proper monitoring and configuration are essential to maintain optimal performance.

Figure 1:
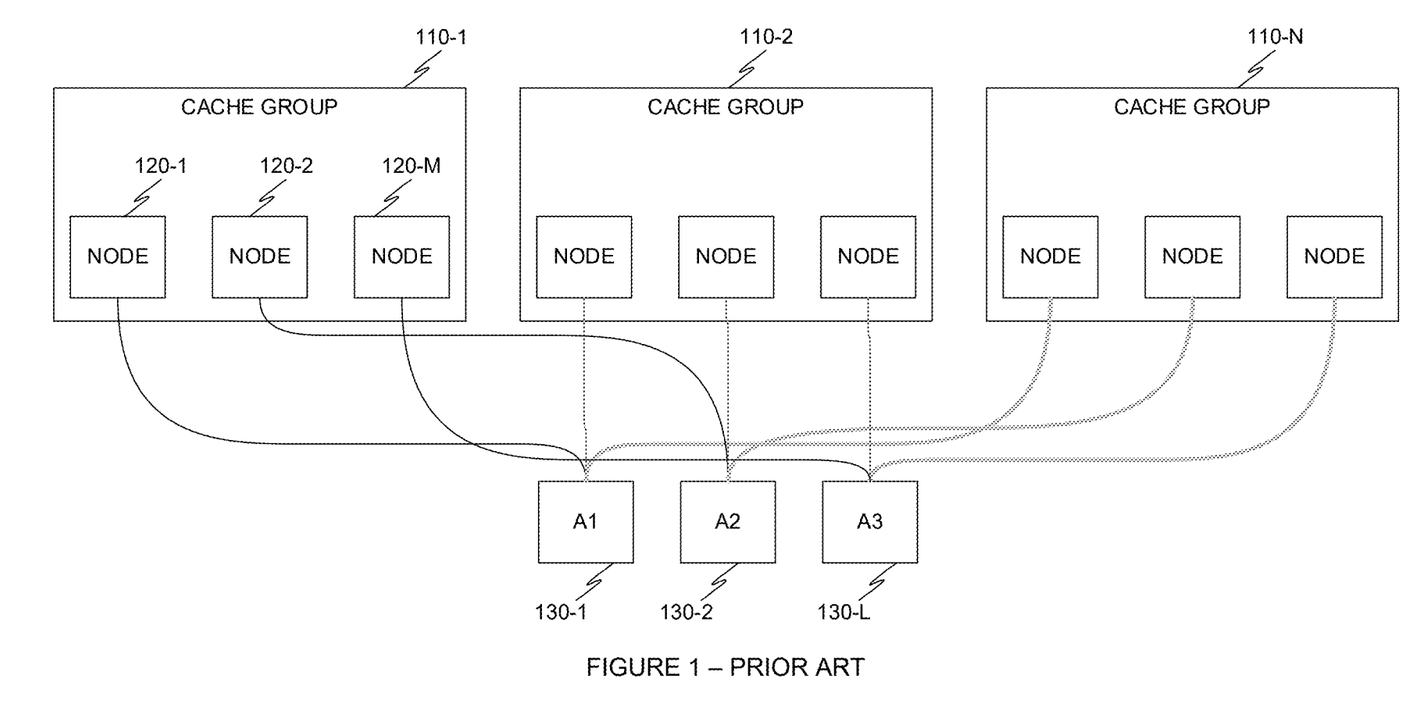
FIG. 1 is a schematic diagram of an anycast network implemented in prior art.

FIG. 1 is a schematic diagram of an anycast network implemented in prior art. A plurality of cache groups 110-1 through 110-N are implemented in a network computing environment, such as a CDN. Each cache group includes a plurality of server nodes, such as server nodes 120-1 through 120-M. Each server node is configured to provide content, and servers are addressed requests using IP addresses 130-1 through 130-L.

Each anycast address 130 is mapped to a plurality of cache servers, such that each cache server is addressable by an anycast address 130, and each anycast address 130 is mapped to multiple cache servers, wherein the multiple cache servers are implemented each in a different cache group.

A DNS router only responds with an anycast address if all the cache servers to which the anycast address is assigned are up and available. If a single server associated with the anycast address is down, the anycast address is not utilized by the DNS router. For example, if a cache server 120-1 is down, then a DNS router is configured to round-robin only between the remaining addresses 130-1 through 130-L, rendering all the cache servers associated with the address 130-1 unreachable.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include initiating a plurality of cache groups in a content network, each cache group including a plurality of cache servers. The method may also include assigning a first cache server of a first cache group of the plurality of cache groups a first anycast address of a plurality of anycast addresses, the first anycast address assigned to a second cache server of a second cache group of the plurality of cache groups. The method may furthermore include assigning the second cache server of the second cache group a second anycast address of the plurality of anycast addresses, the second anycast address assigned to another cache server, where the another cache server is in a third cache group. Other embodiments of this aspect include corresponding computer systems, apparatus, and computer programs recorded on one or more computer storage devices, each configured to perform the actions of the methods.

Implementations may include one or more of the following features. The method may include: configuring a domain name system (DNS) to respond with a list of anycast addresses, each anycast address associated with a plurality of cache servers, and each cache server associated with a plurality of anycast addresses. The method may include: configuring the DNS to respond with a list of anycast addresses, each address corresponding to an available cache server. The method may include: assigning a third cache server of the second cache group a third anycast address of the plurality of anycast addresses, the third anycast address further assigned to the first cache server. The method may include: receiving a request to provide content; selecting an anycast address of the plurality of anycast addresses; and routing the request to a cache server associated with the anycast address. The method may include: providing the content based on the request from the cache server. The method may include: selecting the anycast address based on a round-robin allocation. The method may include: determining that the a third anycast address is not available and determining that the first cache server is available only through the first anycast address. Implementations of the described techniques may include hardware, a method or process, or a computer tangible medium.

In one general aspect, a non-transitory computer-readable medium may include one or more instructions that, when executed by one or more processors of a device, cause the device to: initiate a plurality of cache groups in a content network, each cache group including a plurality of cache servers; assign a first cache server of a first cache group of the plurality of cache groups a first anycast address of a plurality of anycast addresses, the first anycast address assigned to a second cache server of a second cache group of the plurality of cache groups; and assign the second cache server of the second cache group a second anycast address of the plurality of anycast addresses, the second anycast address assigned to another cache server, where the another cache server is in a third cache group. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: initiate a plurality of cache groups in a content network, each cache group including a plurality of cache servers. The system may in addition assign a first cache server of a first cache group of the plurality of cache groups a first anycast address of a plurality of anycast addresses, the first anycast address assigned to a second cache server of a second cache group of the plurality of cache groups. The system may moreover assign the second cache server of the second cache group a second anycast address of the plurality of anycast addresses, the second anycast address assigned to another cache server, where the another cache server is in a third cache group. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: configure a domain name system (DNS) to respond with a list of anycast addresses, each anycast address associated with a plurality of cache servers, and each cache server associated with a plurality of anycast addresses. The system where the memory contains further instructions which when executed by the processing circuitry further configure the system to: configure the DNS to respond with a list of anycast addresses, each address corresponding to an available cache server. The system where the memory contains further instructions which when executed by the processing circuitry further configure the system to: assign a third cache server of the second cache group a third anycast address of the plurality of anycast addresses, the third anycast address further assigned to the first cache server. The system where the memory contains further instructions which when executed by the processing circuitry further configure the system to: receive a request to provide content; select an anycast address of the plurality of anycast addresses; and route the request to a cache server associated with the anycast address. The system where the memory contains further instructions which when executed by the processing circuitry further configure the system to: provide the content based on the request from the cache server. The system where the memory contains further instructions which, when executed by the processing circuitry, further configure the system to: select the anycast address based on a round-robin allocation. The system where the memory contains further instructions which when executed by the processing circuitry further configure the system to: determine that a third anycast address is not available and determine that the first cache server is available only through the first anycast address. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
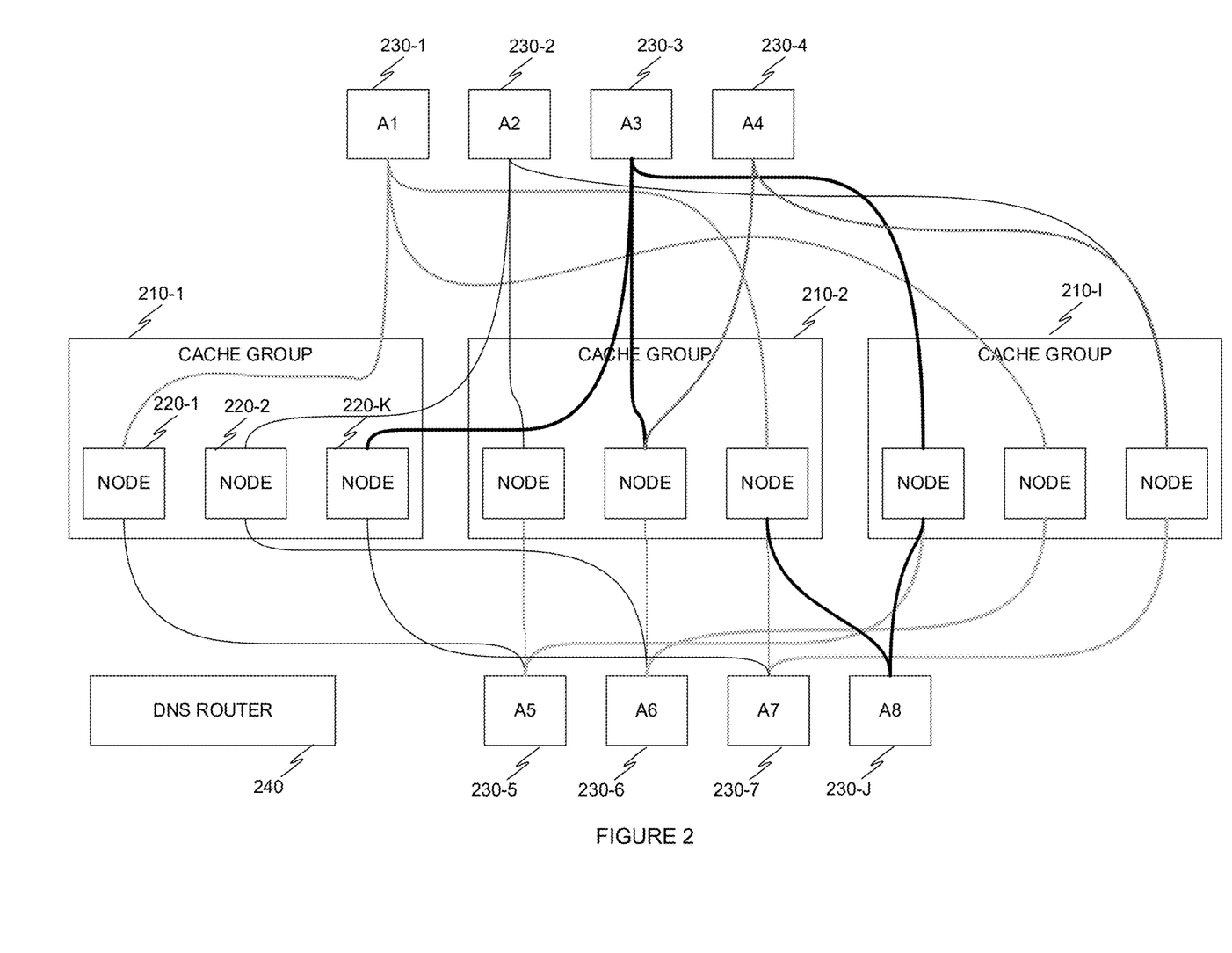
FIG. 2 is an example schematic diagram of a content delivery network implementing anycast addressing, implemented in accordance with an embodiment.

FIG. 2 is an example schematic diagram of a content delivery network implementing anycast addressing, implemented in accordance with an embodiment. According to an embodiment, a domain name system (DNS) router 240 is configured to receive requests for content and select an anycast address and route such requests to the selected anycast address.

In an embodiment, the DNS router 240 is configured to route a request to an address only if all cache servers associated with the anycast address are available. Where a single cache server associated with a particular anycast address is down, the anycast address is not utilized by the DNS router 240, and each cache server associated with the anycast address is therefore not utilized, despite being functional.

In some embodiments, a plurality of cache groups 210-1 through 210-I are deployed in a content delivery network (CDN), where each cache group includes a plurality of cache servers. For example, a first cache group 210-1 includes a plurality cache servers 220-1 through 220-K. A cache server 220 is also referred to as a node in a CDN.

In certain embodiments, the DNS router 240 is configured to route requests to any of a plurality of anycast addresses 230-1 through 230-J. In an embodiment, a first cache server 220-2 is associated with a first anycast address 230-2 and a second anycast address 230-6. Thus, when a corresponding cache server in cache group 210-2 which is also assigned the second anycast address 230-6 fails, or is otherwise inoperable, inaccessible, etc., the first cache server 220-2 remains accessible through use of the first anycast address 230-2.

Conversely, the anycast addresses 230-3 and 230-4 which are associated with the corresponding cache server in cache group 210-2 are also rendered inoperable, however their corresponding cache servers are still accessible through other anycast addresses assigned to those cache servers.

Thus, according to an embodiment, each cache server is assigned multiple anycast addresses, and each anycast address is assigned to multiple cache servers. In an embodiment, each anycast address is assigned to a plurality of cache servers, each cache server associated with a different cache group.

In some embodiments, each anycast address is assigned a unique group of cache servers, such that no two anycast addresses are assigned the same group of cache servers. This allows for resilience and increased accessibility, such that when a single server is down, the other servers in that group (i.e., assigned the same anycast address) are still accessible through at least another anycast address.

Figure 3:
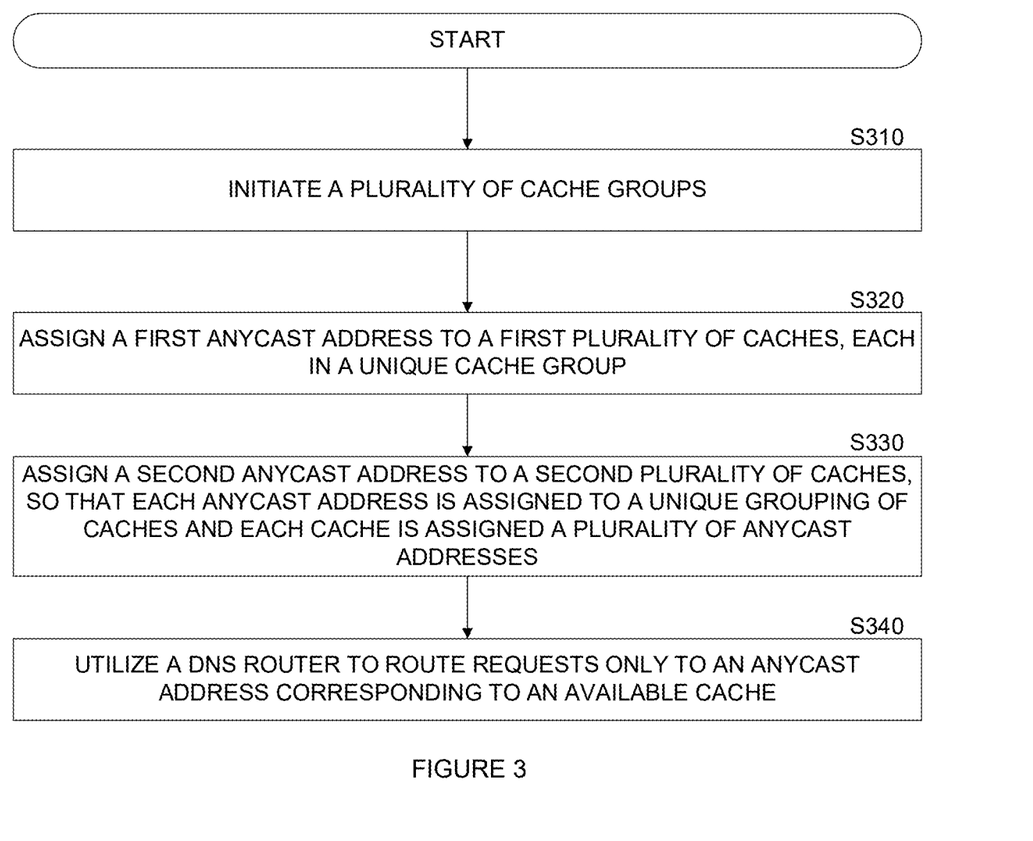
FIG. 3 is an example flowchart of a method for increasing resiliency in anycast address routing, implemented in accordance with an embodiment.

FIG. 3 is an example flowchart of a method for increasing resiliency in anycast address routing, implemented in accordance with an embodiment. Increasing resiliency for cache servers providing content allows to better utilize the compute resources when delivering content through a CDN.

In certain embodiments, network equipment, such as a switch, a layer 4 router (e.g., a transport layer router), and the like, is utilized to detect a content server that is down, and is configured to prevent forwarding traffic thereto. This requires specialized equipment. The present disclosure provides a method for providing an Anycast solution which utilizes the DNS layer alone and does not require specialized equipment to execute. Thus, an improvement in computing technology is realized by removing the requisition of specialized equipment.

At S310, a plurality of cache groups are initiated. In an embodiment, a cache group includes a plurality of cache servers. According to an embodiment, each cache group includes a number of cache servers which correspond to another cache server in another cache group.

In an embodiment, a cache group includes a plurality of cache servers, such that each cache server in the cache group corresponds to at least another cache server in another cache group.

In some embodiments, a cache server is a web server strategically placed to store and deliver frequently accessed content, such as images, videos, or web pages, closer to end users. By caching content locally, it reduces the load on the origin server, decreases latency, and improves website performance. Cache servers enable faster delivery of content by minimizing the distance data travels and reducing network congestion. They are critical for scaling content delivery, enhancing user experience, and managing high traffic efficiently.

At S320, anycast addresses are assigned. In an embodiment, a first anycast address is assigned to a first plurality of cache servers, wherein a first cache server is assigned to a first cache group and a second cache server is assigned to a second cache group.

In an embodiment, assigning an anycast address includes providing a DNS router with a configuration file, such as a JSON configuration file, which includes a range of addresses which can be assigned to a cache server.

In some embodiments, an address is an IP address, such as an IPV4 address, an IPV6 address, a combination thereof, and the like. For example, in an embodiment, a first cache server is assigned a first IPv4 address and a first IPv6 address.

At S330, a second plurality of addresses are assigned. In an embodiment, each cache server is assigned a second anycast address. In some embodiments, the second anycast address is assigned to a group of cache servers, each cache server associated with a different cache group.

In some embodiments, each cache server is assigned a plurality of anycast addresses, and each anycast address is assigned a plurality of cache servers, such that each anycast address is assigned to a unique plurality of cache servers (each of which is associated with a cache group).

According to an embodiment, a unique combination of cache servers includes a cache server from each cache group, from a plurality of cache groups, etc., which are all assigned to an anycast address (e.g., an IPV4 address), and no other anycast address is assigned that same unique combination of cache servers.

At S340, a DNS router is configured to respond to a request. In an embodiment, a DNS router is configured to direct requests in a round-robin technique to a group of cache servers, based on an anycast address. In an embodiment, where a server of a plurality of servers assigned an anycast address is unavailable, the DNS router is configured to cease using that anycast address. The additional servers utilizing this anycast address are not accessible through the anycast address, but are accessible through at least another anycast address, as they are associated with at least another such address.

While the above embodiments discuss a CDN and cache groups, it should be evident that the teachings herein apply to other solutions, such as providing web content from web servers, where a web server is utilized in place of a cache server.

Figure 4:
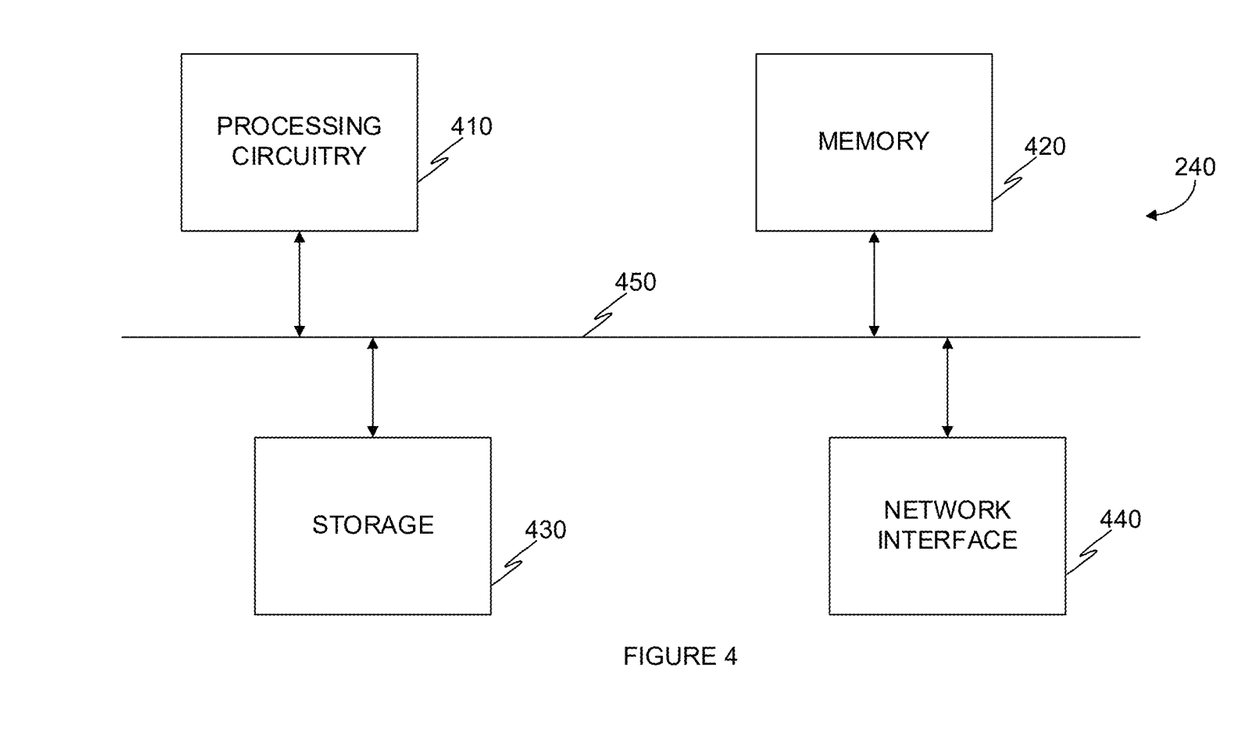
FIG. 4 is an example schematic diagram of a DNS router according to an embodiment.

FIG. 4 is an example schematic diagram of a DNS router 240 according to an embodiment. The DNS router 240 includes, according to an embodiment, a processing circuitry 410 coupled to a memory 420, a storage 430, and a network interface 440. In an embodiment, the components of the DNS router 240 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the DNS router 240 with communication with, for example, the cache groups, the cache servers, a combination thereof, and the like, according to an embodiment.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing resilient multi-location content networks, comprising:
    initiating a plurality of cache groups in a content network, each cache group including a plurality of cache servers;
    assigning a first cache server of a first cache group of the plurality of cache groups a first anycast address of a plurality of anycast addresses, the first anycast address assigned to a second cache server of a second cache group of the plurality of cache groups;
    assigning the second cache server of the second cache group a second anycast address of the plurality of anycast addresses, the second anycast address assigned to another cache server, wherein the another cache server is in a third cache group;
    assigning a third cache server of the second cache group a third anycast address of the plurality of anycast addresses, the third anycast address further assigned to the first cache server, wherein the plurality of anycast addresses are selected based on a round-robin allocation;
    determining that the third anycast address is not available; and
    determining that the first cache server is available only through the first anycast address.

2. The method of claim 1, further comprising:
    configuring a domain name system (DNS) to respond with a list of anycast addresses, each anycast address associated with a plurality of cache servers, and each cache server associated with a plurality of anycast addresses.

3. The method of claim 2, further comprising:
    configuring the DNS to respond with a list of anycast addresses, each address corresponding to an available cache server.

4. The method of claim 1, further comprising:
    receiving a request to provide content;
    selecting an anycast address of the plurality of anycast addresses; and
    routing the request to a cache server associated with the anycast address.

5. The method of claim 4, further comprising:
    providing the content based on the request from the cache server.

6. A non-transitory computer-readable medium storing a set of instructions for providing resilient multi-location content networks, the set of instructions comprising:
    one or more instructions that, when executed by one or more processors of a device, cause the device to:
        initiate a plurality of cache groups in a content network, each cache group including a plurality of cache servers;
        assign a first cache server of a first cache group of the plurality of cache groups a first anycast address of a plurality of anycast addresses, the first anycast address assigned to a second cache server of a second cache group of the plurality of cache groups;
        assign the second cache server of the second cache group a second anycast address of the plurality of anycast addresses, the second anycast address assigned to another cache server, wherein the another cache server is in a third cache group;
        assign a third cache server of the second cache group a third anycast address of the plurality of anycast addresses, the third anycast address further assigned to the first cache server, wherein the plurality of anycast addresses are selected based on a round-robin allocation;

determine that the third anycast address is not available; and determine that the first cache server is available only through the first anycast address.

7. A system for providing resilient multi-location content networks comprising:

a processing circuitry;

a memory, the memory containing instructions that, when executed by the processing circuitry, configure the system to:

initiate a plurality of cache groups in a content network, each cache group including a plurality of cache servers;

assign a first cache server of a first cache group of the plurality of cache groups a first anycast address of a plurality of anycast addresses, the first anycast address assigned to a second cache server of a second cache group of the plurality of cache groups;

assign the second cache server of the second cache group a second anycast address of the plurality of anycast addresses, the second anycast address assigned to another cache server, wherein the another cache server is in a third cache group;

assign a third cache server of the second cache group a third anycast address of the plurality of anycast addresses, the third anycast address further assigned to the first cache server, wherein the plurality of anycast addresses are selected based on a round-robin allocation;

determine that the third anycast address is not available; and determine that the first cache server is available only through the first anycast address.

8. The system of claim 7, wherein the memory contains further instructions which when executed by the processing circuitry further configure the system to:

configure a domain name system (DNS) to respond with a list of anycast addresses, each anycast address associated with a plurality of cache servers, and each cache server associated with a plurality of anycast addresses.

9. The system of claim 8, wherein the memory contains further instructions which when executed by the processing circuitry further configure the system to:

configure the DNS to respond with a list of anycast addresses, each address corresponding to an available cache server.

10. The system of claim 7, wherein the memory contains further instructions which when executed by the processing circuitry further configure the system to:

receive a request to provide content;

select an anycast address of the plurality of anycast addresses; and route the request to a cache server associated with the anycast address.

11. The system of claim 10, wherein the memory contains further instructions which when executed by the processing circuitry further configure the system to:

provide the content based on the request from the cache server.

* * * * *